United States Patent [19]
Nagano

[11] Patent Number: 4,889,521
[45] Date of Patent: Dec. 26, 1989

[54] MULTISTAGE SPROCKET ASSEMBLY FOR A BICYCLE

[75] Inventor: Masashi Nagano, Izumi, Japan

[73] Assignee: Shimano Industrial Company Limited, Osaka, Japan

[21] Appl. No.: 261,323

[22] Filed: Oct. 24, 1988

[30] Foreign Application Priority Data

Oct. 21, 1987 [JP] Japan ............................ 62-161539
Jun. 4, 1988 [JP] Japan ............................ 63-74583

[51] Int. Cl.⁴ ............................................. F16H 11/08
[52] U.S. Cl. .................................................. 474/164
[58] Field of Search ............... 474/160, 162, 164, 152, 474/155–157; 74/594.2; 29/159 R

[56] References Cited

U.S. PATENT DOCUMENTS

4,330,286  5/1982  Nagano ............................ 474/16 X

Primary Examiner—Thuy M. Bui
Attorney, Agent, or Firm—Stevens, Davis, Miller & Mosher

[57] ABSTRACT

A multistage sprocket assembly is provided which includes at least one larger diameter sprocket and at least one smaller diameter sprocket assembled in a relationship such that the center point between a pair of adjacent teeth at the larger diameter sprocket and the center point between a pair of adjacent teeth at the smaller diameter sprocket are positioned on a tangent extending along the chain path when the chain is being shifted from the smaller diameter sprocket to the larger diameter sprocket. The distance between both the center points is equal to an integer multiple of the chain pitch. A chain guide portion is provided at the inside surface of the larger diameter sprocket and at a position corresponding to a moving path of a driving chain traveling between the aforesaid center points for allowing the chain to move axially of the sprocket assembly slightly toward the larger diameter sprocket during shifting.

6 Claims, 4 Drawing Sheets

MULTISTAGE SPROCKET ASSEMBLY FOR A BICYCLE

FIELD OF THE INVENTION

The present invention relates to a multistage sprocket assembly for a bicycle, and more particularly, to a multistage sprocket assembly for a bicycle, which comprises at least one larger diameter sprocket and at least one smaller diameter sprocket and is mounted on a crank or a rear hub of the bicycle so as to shift a driving chain for changing the bicycle speed.

BACKGROUND OF THE INVENTION

Conventionally, this kind of multistage sprocket assembly, as disclosed in Japanese Utility Model Publication Gazette No. Sho 55-28,617 (corresponding to U.S. Pat. No. 4,268,259), includes a smaller diameter sprocket and a larger diameter sprocket assembled such that (1) the center point between a pair of adjacent teeth at the larger diameter sprocket and the center point between a pair of adjacent teeth at the smaller diameter sprocket are positioned on the tangent extending along the chain path, (2) a distance between the aforesaid center points is an integer multiple of the chain pitch, and (3) a first tooth of the larger diameter sprocket positioned behind the center point between the adjacent teeth at the larger diameter sprocket in the rotation direction for driving the bicycle is made to be easily engageable with the driving chain, thereby improving the speed change efficiency when the driving chain is shifted from the smaller diameter sprocket to the larger diameter sprocket.

The driving chain comprises a large number of pairs of inner link plates, pair of outer link plates and pins, connected in an endless manner. An interval between the opposite surfaces of each pair of inner link plates is smaller than that between the opposite surfaces of each pair of outer link plates. In other words, each pair of the outer link plates is positioned outside the inner link plates and form a space larger in width, while each pair of the inner link plate is positioned inside the outer link plates and form a space smaller in width.

The driving chain constructed as described above is biased by a derailleur toward the larger diameter sprocket so as to be shifted thereto from the smaller diameter sprocket. During shifting, when the outer link plates of the chain correspond to the first tooth of the larger diameter sprocket, since the first tooth is the easily-engageable tooth and coincides with the chain pitch, the wider space between the outer link plates is at most fitted onto the first tooth, whereby the chain engages with the larger diameter sprocket. Even when the outer link plates correspond to the first tooth as described above, the end face of a link pin and the outer surface of the outer link plate interfere with the inside surface of the larger diameter sprocket facing toward the smaller diameter sprocket side, so that the chain may not be moved further toward the outside surface of the larger diameter sprocket, such that it will not reliably engage with the first tooth.

On the other hand, when the inner link plates correspond to the first tooth of the larger diameter sprocket, the outer link plate outside the inner link plate, in turn at the larger diameter sprocket side, interferes with the inside surface of the large diameter sprocket, whereby the inner link plate does not deviate sufficiently toward the first tooth, with the result that the space between the inner link plates is not engageable with the first tooth.

In this case, when a second tooth adjacent to the first tooth and behind in the driving rotation direction of the sprocket is made easily engageable like the first tooth, a space between the pair of outer link plates behind the inner link plates in the traveling direction thereof engages with the second tooth. However, the inner link plates behind the aforesaid outer link plates may not engage with a third tooth adjacent to the second tooth and behind in the driving rotation direction, so that even when the space between the outer link plates engages well with the second tooth, the chain may fail to engage with the third tooth and ride thereon, resulting in the chain possibly disengaging from the larger diameter sprocket.

This problem can be solved by making the third tooth easily engageable like the first and second teeth. On the other hand, in a case where the outer link plates are biased in the position at which they correspond to the first tooth, the next outer link plates corresponding to the third tooth may be caught thereby. In this case, the third tooth is not positioned corresponding to an integer multiple of the chain pitch, so that it will not smoothly engage with the chain. Hence, the outer link plates caught by the third tooth may ride on the edge of the tooth crest thereof and forcibly engage therewith, thereby creating a problem in that the speed change efficiency is diminished and also in that loud sounds are generated due to the chain suddenly falling down onto the tooth bottom.

SUMMARY OF THE INVENTION

An object of the invention is to provide a multistage sprocket assembly for a bicycle which solves the above-described problems in the conventional sprocket assembly. According to the invention, the center point between a pair of adjacent teeth at the smaller diameter sprocket and the center point between a pair of adjacent teeth at the larger diameter sprocket are positioned on the tangent line extending along a moving path of the chain when the chain is being shifted from the smaller diameter sprocket to the larger diameter sprocket and a distance between these center points is an integer multiple of the chain pitch, so that the chain is adapted to always smoothly shift from the former sprocket to the latter.

The multistage sprocket assembly of the invention comprises at least one larger diameter sprocket and at least one smaller diameter sprocket, wherein the sprockets are assembled such that the center point between a pair of adjacent teeth at the larger diameter sprocket and the center point between a pair of adjacent teeth at the smaller diameter sprocket are positioned on a tangent extending along the moving path of the driving chain when being shifted from the smaller diameter sprocket engaging therewith to the larger diameter sprocket. The distance between these center points is substantially an integer multiple of the pitch of the chain; and the larger diameter sprocket is provided at its inside surface thereof facing the smaller diameter sprocket and at a position corresponding to the moving path of the chain guide portion allowing the chain to deviate toward the larger diameter sprocket.

In addition, in the present invention, the terminology "distance equal to an integer multiple of the chain pitch" includes the distance between the center points 01 and and 02 equal to an integer multiple of the chain pitch and also a distance somewhat smaller than the chain pitch.

Accordingly, in the present invention, the chain, when shifted from the smaller diameter sprocket to the larger diameter sprocket, can be reliably biased a predetermined amount toward the outside surface of the larger diameter sprocket along the chain guide portion provided at the inside surface of the larger diameter sprocket facing the smaller diameter sprocket. Hence, when the outer link plate of the chain corresponds in position to the first tooth positioned behind the center point between a pair of adjacent teeth in the driving rotation direction, the space between the outer link plates can always reliably engage with the first tooth. Moreover, even when the inner link plate corresponds in position to the first tooth, a space between the outer link plates adjacent to and behind the inner link plates in the traveling direction thereof can reliably engage with the second tooth behind the first tooth in the driving rotation direction of the sprocket.

Also, when the outer link plates engage with the first tooth, the next outer link plates adjacent to the inner link plate behind the former outer link plates in the traveling direction thereof are prevented from riding on a third tooth behind the second tooth in the driving rotation direction of the larger diameter sprocket.

The present invention is further characterized in that at least two teeth among the plurality of teeth of the larger diameter sprocket are speed change teeth with which the chain can easily engage when being shifted from the smaller diameter sprocket to the larger diameter sprocket. These speed change teeth include the first tooth positioned behind the center point between the adjacent teeth at the larger diameter sprocket in the driving rotation direction thereof and one other tooth, with all other teeth of the larger diameter sprocket being formed such that the chain cannot easily engage with them thereby enabling the chain to be shifted to the larger diameter sprocket always at the first tooth thereof in consideration of the relationship with chain pitch. Accordingly, the chain is shifted without mistake and the speed change efficiency is improved.

The present invention is still further characterized in that the speed change teeth include a first tooth, a second tooth, and a third tooth and all other teeth are formed such that they do not easily engage with the chain. Furthermore, the first tooth is provided with a chain guide surface through which the chain, when shifted from the smaller diameter sprocket to the larger diameter sprocket, can be guided in a direction away from the smaller diameter sprocket, that is, axially outwardly of the larger diameter sprocket, with the second tooth being positioned axially outwardly of the larger diameter sprocket with respect to the first tooth and the third tooth similarly with respect to the second tooth.

Thus, the present invention can improve the speed change efficiency, prevent the outer link plate from being caught by the third tooth, and eliminate generation of sounds when the chain engages therewith.

The above and further objects and novel features of the invention will be more fully apparent from the following detailed description when the same is read in connection with the accompanying drawings.

DETAILED DESCRIPTION OF THE PREFERRED EMBODIMENTS

A multistage sprocket assembly of the invention is mounted on a crank or a rear hub of the bicycle.

Figure 1:
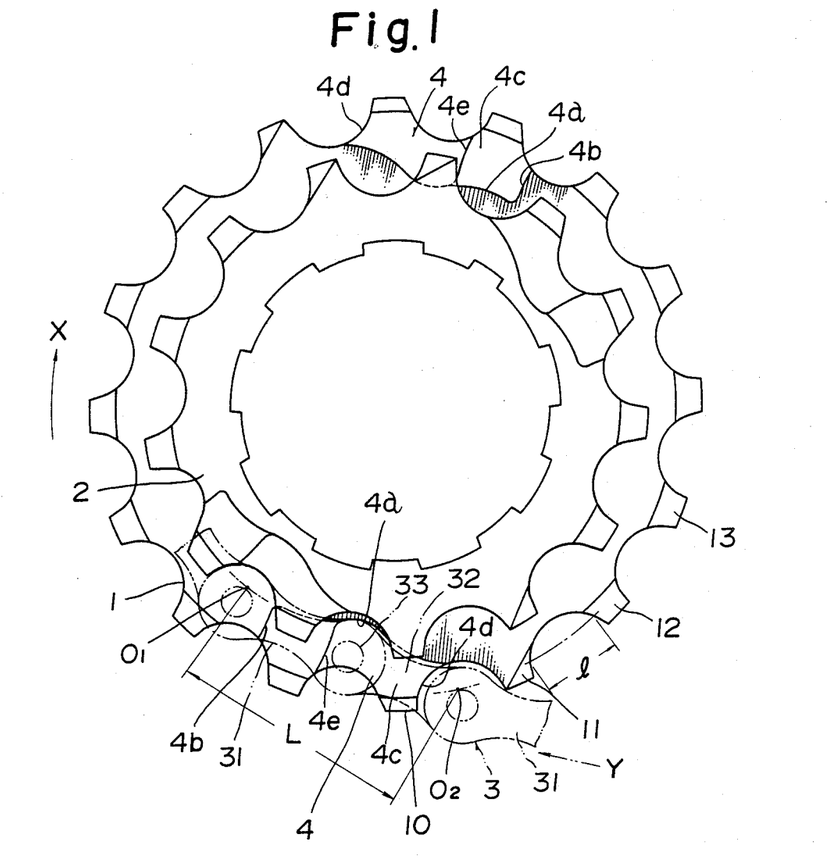
FIG. 1 is a front view of a first embodiment of a multistage sprocket assembly according to the invention.

A first embodiment of the multistage sprocket assembly of the invention in FIG. 1 is mounted on the rear hub of the bicycle, which includes a larger diameter sprocket 1 having 16 teeth at its outer periphery and a smaller diameter sprocket 2 having 13 teeth at its outer periphery, sprockets 1 and 2 being assembled to a driving member (not shown) and spaced from each other at a predetermined interval, the driving member being rotatably supported to a driven member at the rear hub through a bearing.

Also, sprockets 1 and 2 are assembled in a relationship such that the center point 02 between a pair of adjacent teeth at larger diameter sprocket 1 and the center point 01 between a pair of adjacent teeth at smaller diameter sprocket 2 are positioned on a tangent which, as shown by the chain line in FIG. 1, extends along a moving path of a driving chain when shifted from smaller diameter sprocket 2 in engagement therewith to large diameter sprocket 1.

A distance L between centers 01 and 02 is equal to an integer multiple of the chain pitch of chain 3, and a chain guide portion 4 allowing chain 3 to deviate toward larger diameter sprocket 1 is recessed at the inside surface thereof facing smaller diameter sprocket 2 and at the position corresponding to the traveling path of chain 3 when traveling between centers 01 and 02.

Chain guide portion 4 recessed on the inside surface of sprocket 1 is preferably deep enough to prevent the inner link plate of chain 3 at the larger diameter sprocket side from riding on a first tooth 11 at larger diameter sprocket 1, first tooth 11 being positioned behind center 02 at sprocket 1 in the driving rotation direction thereof.

At least two teeth including aforesaid tooth 11 and a tooth 12 adjacent thereto and positioned rearwardly in the rotation direction of sprocket 1 are formed as speed change teeth engageable with chain 3 when shifted from smaller diameter sprocket 2 to larger diameter sprocket 1. The residual teeth except for teeth 11 and 12 are formed as non-easily-engageable teeth through which chain 3 is not shiftable.

Figure 2:
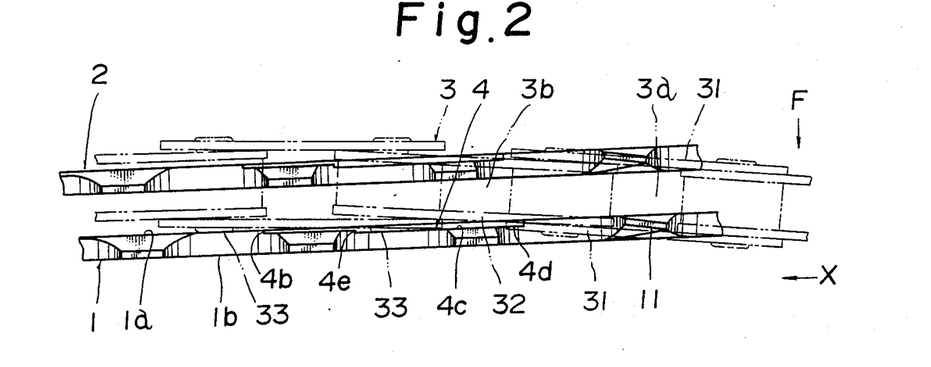
FIG. 2 is a partially omitted developed view of FIG. 1 viewed from below.
Figure 3:
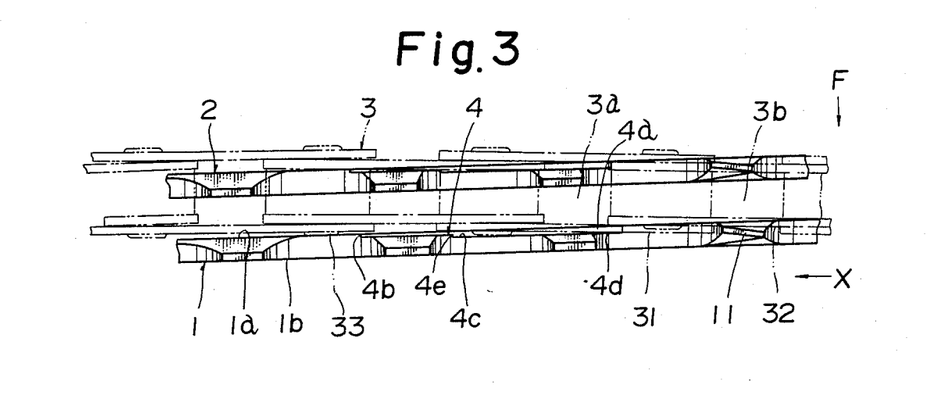
FIG. 3 is a developed view corresponding to FIG. 2, in which a driving chain is shifted at a position different from that in FIG. 2 with respect to the sprockets.

Chain guide portion 4 is made large enough to receive therein the link plates of chain 3 positioned at the larger diameter sprocket side, so that chain 3 can deviate a predetermined amount toward outside surface 1b of larger diameter sprocket 1, thereby reliably engaging with first tooth 11. Chain guide portion 4 recessed as described above, is preferably deep enough to engage a space 3a between outer link plates 31 with first tooth 11 when outer link plates 31 corresponds to first tooth 11 as shown in FIG. 2 and to prevent inner link plate 32 of chain 3 from riding on first tooth 11 when inner link plate 32 corresponds to first tooth 11 as shown in FIG. 3. In brief, chain 3 is preferably controlled with respect to its movement with respect to larger diameter sprocket 1.

Chain guide portion 4 may alternatively be formed of a cutout, but when it is recessed, the movement of chain 3 can be controlled and a stepped portion 4a can receive the link plate of chain 3 when shifted.

In the first embodiment in FIG. 1 of larger diameter sprocket 1 of 16 teeth and smaller diameter sprocket 2 of 13 teeth, a distance L between centers 01 and 02 is equal to twice the pitch of chain 3 as shown by the chain line in FIG. 1.

Accordingly, chain guide portion 4 at inside surface 1a of larger diameter sprocket 1 is formed in the size from an initial end edge 4b to a termination 4d at sprocket 1, with initial end edge 4b being somewhat spaced apart from the position corresponding to center 01 between the two adjacent teeth at sprocket 2 and between center 01 and center 02 between two adjacent teeth at sprocket 1, with termination 4d being the tooth bottom between first tooth 11 and a tooth 10 positioned ahead of center 02 in the driving rotation direction (the direction of arrow X) of sprocket 1.

In a condition where outer link plate 31 of chain 31 corresponds to first tooth 11 as shown in FIGS. 1 and 2, at chain guide position 4 are positioned inner link plate 32 positioned ahead of outer link plate 31 in the traveling direction (in the direction of arrow Y in FIG. 1) of chain 3, part of an outer link plate 31 positioned ahead of inner link plate 32 in the traveling direction, and a link pin 33 for connecting link plates 32 and 31, with link pin 33 abutting at its end face against bottom 4c of recessed chain guide portion 4.

In a condition where inner link plate 32 corresponds to first tooth 11 as shown in FIG. 3, at chain guide portion 4 are positioned outer link plate 31 ahead of inner link plate 32 in the traveling direction of chain 3, part of inner link plate 32 positioned ahead of outer link plate 31, and a link pin 33 for connecting link plates 31 and 32, with the end face of link pin 33 and outer link plate 31 abutting against the bottom of recessed chain guide portion 4.

Figure 5:
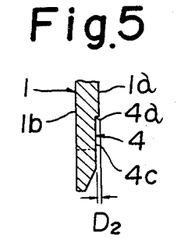
FIG. 5 is a sectional view taken on line V—V in FIG. 4.
Figure 6:
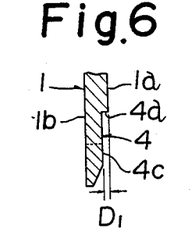
FIG. 6 is a sectional view taken on line VI—VI in FIG. 4.

In chain guide portion 4, a depth D1 (in FIG. 6) in a range from an intermediate portion (i.e., between initial and 4b and termination 4d) to the termination 4d is made larger than depth D2 (in FIG. 5) in a range from initial end edge 4b to the intermediate portion.

Also, in the first embodiment, a stepped portion 4e is provided at the intermediate portion of guide portion 4 so as to stepwise change the depth thereof, but chain guide portion 4 may alternatively be inclined throughout its entire length.

Figure 4:
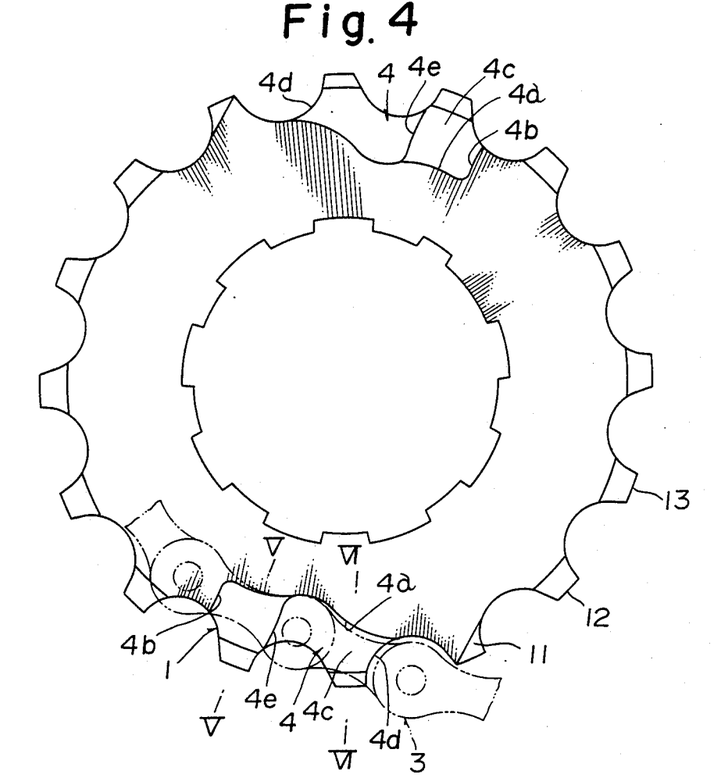
FIG. 4 is a front view of a larger diameter sprocket only.

Since teeth facing chain guide portion 4 each are reduced in thickness to an extent corresponding to the depth of guide portion 4, it is preferable to make these teeth larger in circumferential width than the other teeth as shown in FIGS. 1 and 4, thereby restricting the lowering of strength of these reduced-thickness teeth.

Figure 7:
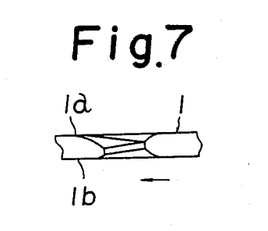
FIG. 7 is an illustration of another example of a tooth formed to be not easily engageable with the chain.

All of the teeth except for first and second teeth 11 and 12 are made non-easily-engageable. The non-easily-engageable teeth, as shown in FIGS. 2 and 3, are each chamfered at their inner surface facing smaller diameter sprocket 2, or, as shown in FIG. 7, inclined forwardly in the driving rotation direction (in the direction of arrow X) and reversely to smaller diameter sprocket 2, that is, toward the outside surface of larger diameter sprocket 1 with respect to the center line thickness between inside surface 1a and outside surface 1b of larger diameter sprocket 1, thereby being made difficult to engage with chain 3.

In addition, first and second teeth 11 and 12 are not made non-easily-engageable because chain 3 is intended to reliably engage with first tooth 11, and spaces 3a and 3b between the link plates of chain 3 in engagement with tooth 11 are to reliably engage with second tooth 12, whereby first and second teeth 11 and 12 are preferably easily engageable with chain 3.

Also, a distance between the adjacent teeth and on the pitch circle of respective sprockets 1 and 2 is made larger by a predetermined distance than an outer diameter of a roller of chain 3. Accordingly, distance L between centers 01 and 02 is smaller than an integer multiple of the chain pitch. In other words, when sprockets 1 and 2 are mounted on the rear hub, a driving force from pedaling is transmitted from chain 3 to sprocket 1 or 2, whereby when chain 3 is shifted from sprocket 2 to sprocket 1, the roller at the smaller diameter sprocket 2 side abuts against the rear surface of a tooth ahead of the roller in the driving rotation direction of sprocket 2, and the roller moving toward larger diameter sprocket 1 and caught by the tooth thereof abuts against the front surface of first tooth 11 in the driving rotation direction of sprocket 1, whereby when both sprockets 1 and 2 are aligned, distance L is somewhat smaller than an integer multiple of the chain pitch. In addition, when the distance between the adjacent teeth on the pitch circle corresponds to the outer diameter of the roller, distance L is made equal to an integer multiple of the chain pitch.

When chain 3 is shifted from smaller diameter sprocket 2 to larger diameter sprocket 1 by a rear derailleur, the engagement of chain 3 with sprockets 1 and 2 will be described in accordance with FIGS. 1 through 3.

In FIGS. 1 and 3, when chain 3 in engagement with smaller diameter sprocket 2 is displaced by the rear derailleur to larger diameter sprocket 1, chain 3 in part positioned ahead in the driving rotation direction (in the direction of arrow X) remains at smaller diameter sprocket 2 and the same positioned at the rear derailleur operation side reaches the lateral side of sprocket 1 to thereby be inclined and biased toward sprocket 1 as shown in FIGS. 2 and 3.

Also, chain guide portion 4 is provided on the traveling path of chain 3 when traveling between centers 01 and 02, so that chain 3 travels a predetermined amount toward the outside surface of sprocket 1, thereby reliably engaging with first tooth 11 thereof.

Since chain guide portion 4 is recessed to an extend such that inner link plate 32 of chain 3 at the larger diameter sprocket 1 side does not ride on first tooth 11, when inner link plate 32 is positioned corresponding thereto, outer link plate 31 abuts against termination 4d of chain guide portion 4 as shown in FIGS. 3 and chain 3 is restricted from moving toward the outside surface, thereby preventing inner link plate 32 from riding on first tooth 11.

Also, chain 3 can inevitably engage only with first or second tooth 11 or 12 because all other teeth are non-easily-engageable teeth, thereby ensuring smooth shifting of chain 3.

Figure 8:
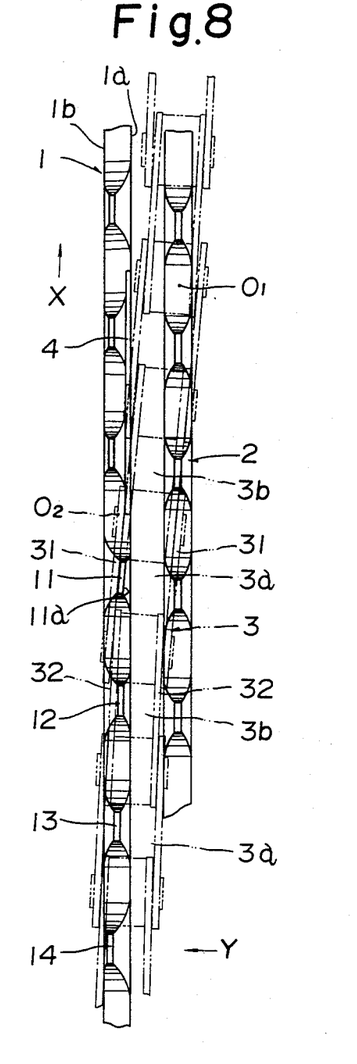
FIG. 8 is a developed view of a second embodiment of the invention, corresponding to FIG. 2.
Figure 9:
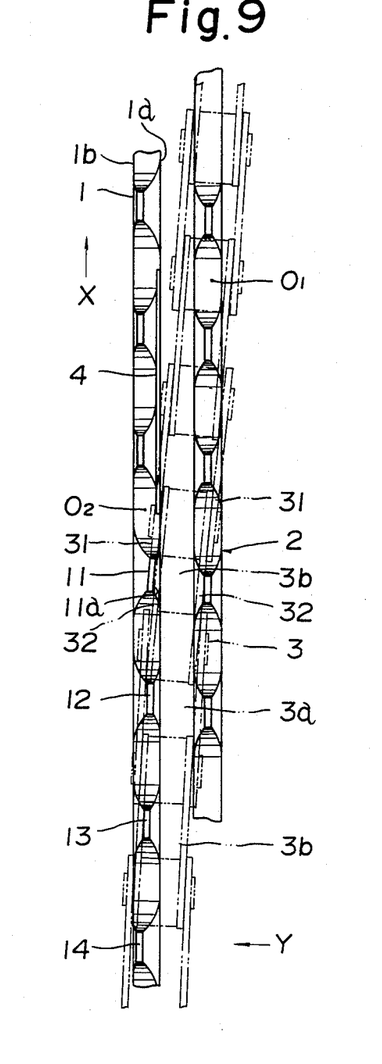
FIG. 9 is a developed view of the FIG. 8 embodiment corresponding to FIG. 3.

Alternatively, as shown in a second embodiment of the invention illustrated in FIGS. 8 and 9, a third tooth 13 positioned behind second tooth 12 in the driving rotation direction of sprocket 1 may also not be a non-easily-engageable tooth but rather a speed change tooth engageable with chain 3.

In FIGS. 8 and 9, all of teeth 14 except for the first through third teeth 11 through 13 at larger diameter sprocket 1 deviate axially outwardly thereof, that is, reversely to sprocket 2, so as to render difficult any engagement thereof with chain 3. First through third teeth 11 through 13 are displaced axially inwardly of sprocket 1, that is, toward sprocket 2, thereby being easily engageable with chain 3. Moreover, first tooth 11 is provided with a chain guide surface 11a for guiding therethrough chain 3 reversely to sprocket 2. Second tooth 12 is displaced reversely thereto with respect to first tooth 11, and likewise third tooth 13 with respect to second tooth 12, so that second tooth 12 is easily engageable with chain 3 subsequently to first tooth 11, with third tooth 13 being not difficult but not-easier to engage with chain 3 than second tooth 12.

In the above-mentioned construction, chain guide surface 11a, as shown in FIGS. 8 and 9, is inclined rearwardly in the driving rotation direction of larger diameter sprocket 1 and reversely to smaller diameter sprocket 2 with respect to the center line of thickness of sprocket 1. Alternatively, chain guide surface 11a may be formed such that first tooth 11 is parallel to the aforesaid center line and cutout at a portion disposed rearward in the driving rotation direction of sprocket 1 and facing smaller diameter sprocket 2, for example, at a portion from the bottom to the crest of the tooth.

When chain 3 is shifted from smaller diameter sprocket 2 to larger diameter sprocket 1, space 3a between outer link plates 31 first engages with first tooth 11. Therefore, first tooth 11 is made to be most easily engageable with chain 3. Second tooth 12 is also made such that it can easily engage with chain 3; this is made possible by providing a narrow space 3b between inner link plates 32 behind wide space 3a. Narrow space 3b is easily engageable with second tooth 12, and, when inner link plates 32 are biased at the position corresponding to first tooth 11 and first tooth 11 cannot catch space 3a, second tooth 12 is adapted to catch space 3a. Also, when second tooth 12 catches wide space 3a, narrow space 3b adjacent thereto is adapted to easily engage with third tooth 13, such that third tooth 13 is made easily engageable with chain 3.

In addition, the displacement of third tooth 13 toward smaller diameter sprocket 2 is reduced more than that of second tooth 12 because, when inner link plates 32 are biased at the position corresponding to second tooth 12 so that first and second teeth 11 and 12 cannot catch wide space 3a, the outer link plate is prevented from riding on third tooth 13.

In the above-described construction, in a condition in which chain 3 is shifted from smaller diameter sprocket 2 to larger diameter sprocket 1, when first tooth 11 corresponds to outer link plate 31, a distance between centers 01 and 02 of an interval between the two adjacent teeth at sprockets 1 and 2 is substantially an integer multiple of the chain pitch so that the roller of chain 3 is biased to be positioned corresponding to center 02 between the adjacent teeth at sprocket 1, and first tooth 11 is easily engageable with chain 3, resulting in that wide space 3a between outer link plates 31 adjacent to the roller smoothly engages with first tooth 11.

In this condition, since second tooth 12 behind first tooth 11 in the driving rotation direction of sprocket 1 also is an easily-engageable tooth, space 3b between inner link plate 32 behind outer link plate 31 in the traveling direction and adjacent thereto smoothly engages with second tooth 12, thereby quickly shifting chain 3 to sprocket 1. Also, outer link plate 31 behind inner link plate 32 in the traveling direction can reliably engage with third tooth 13 behind second tooth 12. In other words, tooth 13 is easily engageable with chain 3 and first tooth 11 is provided with a chain guide surface 11a, so that chain 3, when shifted from sprocket 2 to sprocket 1, can be displaced reversely to sprocket 2 more than when guide surface 11a is not provided, and correspondingly second tooth 12 is displaced reversely to sprocket 2 and third tooth 13 with respect to second tooth 12, thereby reliably preventing outer link plate 31 from riding on third tooth 13. Also, chain 3 can smoothly engage with third tooth 13 without riding thereon and eliminate sounds generated when engaging with chain 3.

On the other hand, when inner link plate 32 corresponds in position to first tooth 11 when chain 3 is being shifted, space 3b between inner link plates 32 does not engage with first tooth 11, but a space 3a between the next outer link plates 31 positioned behind inner link plates 32 in the traveling direction (the direction of arrow Y) engages with second tooth 12. In this condition, the next inner link plates 32 positioned behind outer link plates 31 in the traveling direction correspond to third tooth 13. Since third tooth 13 is a speed change tooth, space 3b between inner link plates 32 engages with third tooth 13, whereby chain 3 is quickly shifted to larger diameter sprocket 1.

Alternatively, the multistage sprocket assembly may comprise three or more sprockets and may be used for a crank means at the bicycle.

As is apparent from the above, the present invention has at least one larger diameter sprocket 1 and at least one smaller diameter sprocket 2 assembled in a relationship such that a center 02 between a pair of adjacent teeth at sprocket 1 and a center 01 between a pair of adjacent teeth at sprocket 2 are positioned on a tangent to the chain path. Also, according to the invention, the distance between centers 01 and 02 is substantially an integer multiple of the chain pitch, and a chain guide portion 4 is provided to allow chain 3 to deviate axially outwardly of sprocket 1 at the inside surface thereof facing sprocket 2 and corresponding to the traveling path of chain 3 when traveling between centers 01 and 02, whereby, when chain 3 is shifted from smaller diameter sprocket 2 to larger diameter sprocket 1, the chain can smoothly engage with sprocket 1 and chain guide portion 4 can displace by a predetermined amount axially outwardly of sprocket 1. Hence, the space between outer link plates 31 can reliably engage with the first tooth behind center 02, and also inner link plates 32, even when corresponding to first tooth 11 but not engaging therewith, never rides on first tooth 11, thereby reliably engaging outer link plates 31 behind inner link plate 32 in the traveling direction. Also, inner link plates 32 behind outer link plates 31 in the traveling direction can reliably engage with third tooth 13 positioned behind second tooth 12 in the driving rotation direction of sprocket 1.

Although several embodiments have been described above, they are merely exemplary of the invention and not to be construed as limiting, the invention being defined solely by the appended claims.

What is claimed is:

1. A multistage sprocket assembly for a bicycle, said sprocket assembly comprising:
   at least one large diameter sprocket having at its outer periphery a plurality of teeth; and at least one smaller diameter sprocket having at its outer periphery a plurality of teeth smaller in number than said plurality of teeth of said larger diameter sprocket, a pair of adjacent teeth of said larger diameter sprocket having a first center point therebetween and a pair of adjacent teeth of said smaller diameter sprocket having a second center point therebetween, said first center point and said second center point being positioned on a tangent line extending along a traveling path between said smaller diameter sprocket and said larger diameter sprocket of a driving chain in engagement with said smaller diameter sprocket when said chain is being shifted from said smaller diameter sprocket to said larger diameter sprocket, a distance between said first center point and said second center point being substantially an integer multiple of a pitch between adjacent links of said chain, and said larger diameter sprocket comprising chain guide means, provided at its inside surface facing said smaller diameter sprocket and at a position of said larger diameter sprocket corresponding to said traveling path of said chain when traveling between said first center point and said second center point, for allowing said chain to move at said chain guide means farther from said smaller diameter sprocket and closer toward said inside surface of said larger diameter sprocket than at other portions of said larger diameter sprocket.

2. A multistage sprocket assembly according to claim 1, wherein at least two teeth among said plurality of teeth of said larger diameter sprocket are speed change teeth which include means for facilitating engagement with said chain when said chain is being shifted from said smaller diameter sprocket to said larger diameter sprocket, said speed change teeth including a first tooth positioned behind said first center point in a driving rotation direction of said larger diameter sprocket, all other teeth of said plurality of teeth of said larger diameter sprocket including means for inhibiting engagement thereof with said chain when said chain is being shifted from said smaller diameter sprocket to said larger diameter sprocket.

3. A multistage sprocket assembly according to claim 2, wherein said speed change teeth comprise a first tooth, a second tooth adjacent to and behind said first tooth in said driving rotation direction of said larger diameter sprocket, and a third tooth adjacent to and positioned behind said second tooth in said driving rotation direction of said larger diameter sprocket.

4. A multistage sprocket assembly according to claim 3, wherein said first tooth includes a chain guide surface for guiding said chain in a direction away from said smaller diameter sprocket when said chain is being shifted from said smaller diameter sprocket to said larger diameter sprocket, said second tooth is positioned farther from said smaller diameter sprocket than said first tooth is positioned from said smaller diameter sprocket, and said third tooth is positioned farther from said smaller diameter sprocket than said second tooth is positioned from said smaller diameter sprocket.

5. A multistage sprocket assembly according to claim 1, wherein said chain guide means comprises a chain guide portion recessed at said surface of said larger diameter sprocket facing said smaller diameter sprocket, said recess having a sufficient depth at a side of said first center point to prevent an outside link plate of said chain from riding on a tooth positioned behind said first center point in said driving rotation direction of said larger diameter sprocket.

6. A multistage sprocket assembly according to claim 1, wherein said chain guide means comprises a chain guide portion formed of a cutout in said inside surface of said larger diameter sprocket.

* * * * *

UNITED STATES PATENT AND TRADEMARK OFFICE
CERTIFICATE OF CORRECTION

PATENT NO. : B1 4,889,521
DATED : May 9, 1995
INVENTOR(S) : Masashi Nagano

It is certified that error appears in the above-indentified patent and that said Letters Patent is hereby corrected as shown below:

Columns 3 and 4:
    Claims 24-28, line 2 in each claim, after "wherein" insert--said chain guide means includes a chain guide portion recessed at said surface of said larger diameter sprocket, and wherein any--.

Signed and Sealed this

Seventeenth Day of October, 1995

Attest:

BRUCE LEHMAN

*Attesting Officer*      *Commissioner of Patents and Trademarks*

REEXAMINATION CERTIFICATE (2567th)

United States Patent [19]

Nagano

[11] B1 4,889,521

[45] Certificate Issued May 9, 1995

[54] MULTISTAGE SPROCKET ASSEMBLY FOR A BICYCLE

[75] Inventor: Masashi Nagano, Izumi, Japan

[73] Assignee: Shimano Industrial Company Limited, Sakai, Japan

Reexamination Request:
No. 90/003,615, Oct. 26, 1994

Reexamination Certificate for:
Patent No.: 4,889,521
Issued: Dec. 26, 1989
Appl. No.: 261,323
Filed: Oct. 24, 1988

[30] Foreign Application Priority Data

Oct. 21, 1987 [JP] Japan .................. 62-161539
Jun. 4, 1988 [JP] Japan .................. 63-74583

[51] Int. Cl.$^6$ .............................................. F16H 63/00
[52] U.S. Cl. .................................................. 474/164
[58] Field of Search ............. 474/160, 162, 164, 152, 474/155–157; 74/594.2; 29/893

[56] References Cited

U.S. PATENT DOCUMENTS

| | | |
|---|---|---|
| 1,202,227 | 10/1916 | Sandifur . |
| 3,956,943 | 5/1976 | Yamasaki ................. 74/243 |
| 4,268,259 | 5/1981 | Segawa .................. 474/160 |
| 4,330,286 | 5/1982 | Nagano .................. 474/164 |

FOREIGN PATENT DOCUMENTS

| | | |
|---|---|---|
| 80-22651 | 5/1981 | France . |
| 52-79654 | 6/1977 | Japan . |
| 52-79655 | 6/1977 | Japan . |
| 54-10670 | 5/1979 | Japan . |
| 55-10216 | 3/1980 | Japan . |
| 57-28715 | 6/1982 | Japan . |
| 2005363 | 4/1979 | United Kingdom . |

*Primary Examiner*—Michael Powell Buiz

[57] ABSTRACT

A multistage sprocket assembly is provided which includes at least one larger diameter sprocket and at least one smaller diameter sprocket assembled in a relationship such that the center point between a pair of adjacent teeth at the larger diameter sprocket and the center point between a pair of adjacent teeth at the smaller diameter sprocket are positioned on a tangent extending along the chain path when the chain is being shifted from the smaller diameter sprocket to the larger diameter sprocket. The distance between both the center points is equal to an integer multiple of the chain pitch. A chain guide portion is provided at the inside surface of the larger diameter sprocket and at a position corresponding to a moving path of a driving chain traveling between the aforesaid center points for allowing the chain to move axially of the sprocket assembly slightly toward the larger diameter sprocket during shifting.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-6 is confirmed.

New claims 7-35 are added and determined to be patentable.

*7. A multistage sprocket assembly for a bicycle, said sprocket assembly comprising:*
*at least one large diameter sprocket having at its outer periphery a plurality of teeth; and at least one smaller diameter sprocket having at its outer periphery a plurality of teeth smaller in number than said plurality of teeth of said larger diameter sprocket, a pair of adjacent teeth of said larger diameter sprocket having a first center point therebetween and a pair of adjacent teeth of said smaller diameter sprocket having a second center point therebetween, said first center point and said second center point being positioned on a tangent line extending along a traveling path between said smaller diameter sprocket and said larger diameter sprocket of a driving chain in engagement with said smaller diameter sprocket when said chain is being shifted from said smaller diameter sprocket to said larger diameter sprocket, a distance between said first center point and said second center point being substantially an integer multiple of a pitch between adjacent links of said chain, and said larger diameter sprocket comprising chain guide means, provided at its inside surface facing said smaller diameter sprocket and at a position of said larger diameter sprocket corresponding to said traveling path of said chain when traveling between said first center point and said second center point, for allowing said chain to move at said chain guide means farther from said smaller diameter sprocket and closer toward said inside surface of said larger diameter sprocket than at other portions of said larger diameter sprocket, said chain guide means comprising a chain guide portion recessed at said surface of said larger diameter sprocket, said recessed chain guide portion spanning a plurality of adjacent teeth.*

*8. The multistage sprocket assembly according to claim 7 wherein said recessed chain guide portion comprises:*
*a first edge portion originating between said pair of adjacent teeth of said larger diameter sprocket having said first center point therebetween; and*
*a second edge portion originating between another pair of adjacent teeth of said larger diameter sprocket.*

*9. The multistage sprocket assembly according to claim 7 including a speed change tooth which includes means for facilitating engagement with said chain when said chain is being shifted from said small diameter sprocket to said larger diameter sprocket, said speed change tooth being positioned behind said first center point in a driving rotation direction of said larger diameter sprocket.*

*10. The multistage sprocket assembly according to claim 9 wherein said recessed chain guide portion comprises:*
*a first edge portion originating between said pair of adjacent teeth of said larger diameter sprocket having said first center point therebetween; and a second edge portion originating between another pair of adjacent teeth of said larger diameter sprocket.*

*11. The multistage sprocket assembly according to claim 9 wherein said recessed chain guide portion comprises:*
*an initial end edge spaced apart from a position corresponding to said second center point between said pair of adjacent teeth of said smaller diameter sprocket and between said second center point and said first center point between said pair of adjacent teeth of said larger sprocket.*

*12. The multistage sprocket assembly according to claim 7 wherein said plurality of teeth spanned by said recessed chain guide portion are recessed by an amount equal to said recessed chain guide portion.*

*13. The multistage sprocket assembly according to claim 7 wherein said plurality of teeth spanned by said recessed chain guide portion are recessed along their entire inner surface facing said smaller diameter sprocket by an amount equal to said corresponding recessed chain guide portion.*

*14. The multistage sprocket assembly according to claim 13 wherein said plurality of teeth spanned by said recessed chain guide portion have a larger circumferential width than other teeth on said larger sprocket.*

*15. The multistage sprocket assembly according to claim 14 wherein said plurality of teeth spanned by said recessed chain guide portion have a larger circumferential width than non-recessed teeth on said larger sprocket.*

*16. The multistage sprocket assembly according to claim 15 wherein said plurality of teeth spanned by said recessed chain guide portion have a larger circumferential width than any other teeth on said larger sprocket not spanned by another recessed chain guide portion.*

*17. The multistage sprocket assembly according to claim 7 wherein said recessed chain guide portion includes a stepped portion at an intermediate portion thereof for changing the depth of the recessed chain guide portion in a driving rotation direction of said larger sprocket.*

*18. The multistage sprocket assembly according to claim 7 wherein said recessed chain guide portion is inclined throughout its entire length for changing the depth of the recessed chain guide portion in a driving rotation direction of said larger sprocket.*

*19. The multistage sprocket assembly for a bicycle, said sprocket assembly comprising:*
*at least one large diameter sprocket having at its outer periphery a plurality of teeth; and at least one smaller diameter sprocket having at its outer periphery a plurality of teeth smaller in number than said plurality of teeth of said larger diameter sprocket, a pair of adjacent teeth of said larger diameter sprocket having a first center point therebetween and a pair of adjacent teeth of said smaller diameter sprocket having a second center point therebetween, said first center point and said second center point being positioned on a tangent line extending along a traveling path between said smaller diameter sprocket and said larger diameter sprocket of a driving chain in engagement with said smaller diameter sprocket when said chain is being shifted from said smaller diameter sprocket to said larger diameter sprocket, a distance between said* first center point and said second center point being substantially an integer multiple of a pitch between adjacent links of said chain, wherein, when a portion of said driving chain is in engagement with said larger diameter sprocket, a sprocket tooth extends into each link of said portion of said driving chain engaging said larger diameter sprocket and said larger diameter sprocket comprising chain guide means, provided at its inside surface facing said smaller diameter sprocket and at a position of said larger diameter sprocket corresponding to said traveling path of said chain when traveling between said first center point and said second center point, for allowing said chain to move at said chain guide means farther from said smaller diameter sprocket and closer toward said inside surface of said larger diameter sprocket than at other portions of said larger diameter sprocket.

20. The multistage sprocket assembly according to claim 19 wherein said chain guide means includes a recessed chain guide portion spanning a plurality of said teeth of said larger diameter sprocket, said recessed chain guide portion comprising:
 a first edge portion originating between said pair of adjacent teeth of said larger diameter sprocket having said first center point therebetween; and
 a second edge portion originating between another pair of adjacent teeth of said larger diameter sprocket.

21. The multistage sprocket assembly according to claim 19 including a speed change tooth which includes means for facilitating engagement with said chain when said chain is being shifted from said small diameter sprocket to said larger diameter sprocket, said speed change tooth being positioned behind said first center point in a driving rotation direction of said larger diameter sprocket.

22. The multistage sprocket assembly according to claim 21 wherein said chain guide means includes a chain guide portion recessed at said surface of said larger diameter sprocket, said recessed chain guide portion comprising:
 a first edge portion originating between said pair of adjacent teeth of said larger diameter sprocket having said first center point therebetween; and a second edge portion originating between another pair of adjacent teeth of said larger diameter sprocket.

23. The multistage sprocket assembly according to claim 21 wherein said chain guide means includes a chain guide portion recessed at said surface of said larger diameter sprocket, said recessed chain guide portion comprising:
 an initial end edge spaced apart from a position corresponding to said second center point between said pair of adjacent teeth of said smaller diameter sprocket and between said second center point and said first center point between said pair of adjacent teeth of said larger sprocket.

24. The multistage sprocket assembly according to claim 19 wherein teeth spanned by said recessed chain guide portion are recessed by an amount equal to said recessed chain guide portion.

25. The multistage sprocket assembly according to claim 19 wherein teeth spanned by said recessed chain guide portion are recessed along their entire inner surface facing said smaller diameter sprocket by an amount equal to said corresponding recessed chain guide portion.

26. The multistge sprocket assembly according to claim 25 wherein teeth spanned by said recessed chain guide portion have a larger circumferential width than other teeth on said larger sprocket.

27. The multistage sprocket assembly according to claim 26 wherein teeth spanned by said recessed chain guide portion have a larger circumferential width than non-recessed teeth on said larger sprocket.

28. The multistage sprocket assembly according to claim 27 wherein teeth spanned by said recessed chain guide portion have a larger circumferential width than any other teeth on said larger sprocket not spanned by another recessed chain guide portion.

29. The multistage sprocket assembly according to claim 19 wherein said chain guide means includes a chain guide portion recessed at said surface of said larger diameter sprocket, said recessed chain guide portion including a stepped portion at an intermediate portion thereof for changing the depth of the recessed chain guide portion in a driving rotation direction of said larger sprocket.

30. The multistage sprocket assembly according to claim 19 wherein said chain guide means includes a chain guide portion recessed at said surface of said larger diameter sprocket, said recessed chain guide portion being inclined throughout its entire length for changing the depth of the recessed chain guide portion in a driving rotation direction of said larger sprocket.

31. A multistage sprocket assembly for a bicycle, said sprocket assembly comprising:
 at least one large diameter sprocket having at its outer periphery a plurality of teeth; and at least one smaller diameter sprocket having at its outer periphery a plurality of teeth smaller in number than said plurality of teeth of said larger diameter sprocket, a pair of adjacent teeth of said larger diameter sprocket having a first center point therebetween and a pair of adjacent teeth of said smaller diameter sprocket having a second center point therebetween, said first center point and said second center point being positioned on a tangent line extending along a traveling path between said smaller diameter sprocket and said larger diameter sprocket of a driving chain in engagement with said smaller diameter sprocket when said chain is being shifted from said smaller diameter sprocket to said larger diameter sprocket, a distance between said first center point and said second center point being substantially an integer multiple of a pitch between adjacent links of said chain, and said larger diameter sprocket comprising chain guide means, provided at its inside surface facing said smaller diameter sprocket and at a position of said larger diameter sprocket corresponding to said traveling path of said chain when traveling between said first center point and said second center point, for allowing said chain to move at said chain guide means farther from said smaller diameter sprocket and closer toward said inside surface of said larger diameter sprocket than at other portions of said larger diameter sprocket, said chain guide means including:
 a surface of said larger diameter sprocket which forms a recess below a first tooth located between said first center point and said second center point; and
 a surface of a second tooth adjacent to and behind said first tooth in the direction of rotation of said larger diameter sprocket and facing said smaller diameter sprocket that is further away from said smaller diameter sprocket than a corresponding surface of a third tooth adjacent to and behind said second tooth in the direction of rotation of said larger diameter sprocket.

32. The multistage sprocket assembly according to claim 31 wherein said recessed surface of said larger diameter sprocket includes a stepped portion at an intermediate portion thereof for changing the depth of the recess in a driving rotation direction of said larger sprocket.

33. The multistage sprocket assembly according to claim 31 wherein said first tooth is recessed along its entire inner surface facing said smaller diameter sprocket by an amount equal to said recess below said first tooth.

34. The multistage sprocket assembly according to claim 33 wherein said surface of said larger diameter sprocket corresponding to said travelling path of said chain is recessed.

35. The multistage sprocket assembly according to claim 34 wherein said recessed surface of said larger diameter sprocket includes a stepped portion at an intermediate portion thereof for changing the depth of the recess in a driving rotation direction of said larger sprocket.

* * * * *